(12) United States Patent
Agarwal (10) Patent No.: US 10,453,091 B2
(45) Date of Patent: Oct. 22, 2019

(54) SYSTEM AND METHOD TO BUILD EXTERNAL FACING INFORMATION PLATFORM TO GENERATE TARGET LIST OF ENTITIES

(71) Applicant: Tata Consultancy Services Limited, Maharashtra (IN)

(72) Inventor: Ankur Agarwal, Berkshire (GB)

(73) Assignee: TATA CONSULTANCY SERVICES LIMITED (IN)

( * ) Notice: Subject to any disclaimer, the term of this patent is extended or adjusted under 35 U.S.C. 154(b) by 685 days.

(21) Appl. No.: 14/286,073

(22) Filed: May 23, 2014

(65) Prior Publication Data

US 2014/0351043 A1 Nov. 27, 2014

(30) Foreign Application Priority Data

May 24, 2013 (IN) .......................... 1841/MUM/2013

(51) Int. Cl.
*G06Q 30/02* (2012.01)
(52) U.S. Cl.
CPC ............................... *G06Q 30/0251* (2013.01)
(58) Field of Classification Search
CPC ................................................. G06Q 30/0251
USPC ..................................................... 705/14.49
See application file for complete search history.

(56) References Cited

U.S. PATENT DOCUMENTS

| 8,270,955 | B2 | 9/2012 | Ramer | |
| 8,374,934 | B1 * | 2/2013 | Becker | G06Q 20/24 |
| | | | | 705/35 |
| 2009/0254971 | A1 * | 10/2009 | Herz | G06Q 10/10 |
| | | | | 726/1 |
| 2009/0268890 | A1 | 10/2009 | Gupta | |
| 2011/0047072 | A1 * | 2/2011 | Ciurea | G06Q 20/10 |
| | | | | 705/39 |

(Continued)

FOREIGN PATENT DOCUMENTS

EP  2218048 A1  8/2010

OTHER PUBLICATIONS

Cipar et al, "LazyBase: trading freshness for performance in a scalable database" Apr. 10, 2012, available at: https://dl.acm.org/citation.cfm?id=2168854 (Year: 2012).*

*Primary Examiner* — Katherine Kolosowski-Gager
(74) *Attorney, Agent, or Firm* — Hayes Soloway P.C.

(57) ABSTRACT

Disclosed is a method and system to process data collected from different sources to generate target list of entities. The system comprises plurality of modules comprising integration module, data filtering module, privacy regulation module, analytical module and campaign execution module. Integration module integrates source databases to collect and store data in base data layer. Data filtering module pulls data and filter data to store informative data in data store. Privacy regulation module filters sensitive data to prepare informative data by applying privacy technique. Analytical module analyzes informative data and generates analytical score. Campaign execution module generates target list of entities by processing informative data with analytical score based on user's request. User accesses informative data and analytical score through user interface wherein sensitive data associated with entity is hidden. Campaign is executed for target list of entities wherein entities are contacted to offer services from user.

15 Claims, 5 Drawing Sheets

(56) References Cited

U.S. PATENT DOCUMENTS

2012/0284080 A1   11/2012  De Oliveira et al.
2014/0344270 A1*  11/2014  Lambert ........... G06F 17/30867
                                                        707/737

* cited by examiner

SYSTEM AND METHOD TO BUILD EXTERNAL FACING INFORMATION PLATFORM TO GENERATE TARGET LIST OF ENTITIES

TECHNICAL FIELD

The present subject matter described herein, in general, relates to data mining and data processing, and more particularly to a system for processing the data collected from sources to generate a target list of entities and executing the campaign for the target list of entities. The present subject matter is also related to building and providing external facing information platform to the external user outside the organization.

BACKGROUND

Present day organizations generate and hold a lot of data about their customers. This data is converted into information which fuels the organization's decision making, campaign management solution and also guide the business processes. There are loads of data which organizations hold but do not completely exploit for example customer behavior and their preferences to the products that organization does not sell. Further the organization does not sell the available quality information with them. Although the same data which is of no direct significance to the organization can provide vital insights to the local businesses having little information about customers in the area they operate in. Some examples of such information are the call records and web logs, banking and credit card transactions, EMI and utility bills, etc.

There is limited capability available currently for organization to let external B2B customer utilize the information they store. In prior art instances organizations have published summarized reports on their customers buying patterns or behaviors which can be referenced by the external B2B customer for building or marketing their products. However this method has a limitation that external B2B customers can only make an inference in customer profile but cannot specifically target those customers which further results in the waste of advertising spend and reduces the return on investment from the advertising.

Presently available prior art techniques publish the high level data with external B2B users. However, this information just provides a guideline to the users. It does not enable them to specifically target those customers. Also these techniques fail to take care of privacy protection of the customer data. No easy-to-use and intuitive way is available to external B2B customers where they can analyze the information and can target those specific customers.

Thus, a heretofore unaddressed need exists in the industry to address the aforementioned deficiencies and inadequacies.

SUMMARY

This summary is provided to introduce aspects related to system and method for processing data collected from one or more sources to generate a target list of entities and the aspects are further described below in the detailed description. This summary is not intended to identify essential features of the claimed subject matter nor is it intended for use in determining or limiting the scope of the claimed subject matter.

Embodiments of the present disclosure provide a system to process data collected from at least one source to generate a target list of entities. Briefly described, in architecture, one embodiment of the system, among others, can be implemented as follows. The system comprises a processor. A memory is coupled to the processor, wherein the processor is capable of executing a plurality of modules stored in the memory. The plurality of module comprises: an integration module configured to integrate at least one source database to collect data and store the data in a base data layer; a data preparation module configured to select the data from the base data layer and process the data to create and store a quantity of informative data in a data store, the data preparation module further comprising: a privacy regulation module configured to process the quantity of informative data to deselect a quantity of sensitive data associated with the data by applying at least one privacy technique to protect the quantity of sensitive data; an analytical module configured to analyze the quantity of informative data with respect to a predetermined analytical score of the quantity of informative data from the base data layer; and a campaign execution module configured to generate the target list of entities by processing the quantity of informative data upon receiving at least one request from a user, wherein the user accesses the quantity of informative data so protected and the predetermined analytical score with a user interface. The quantity of informative data and the predetermined analytical score are displayed to the user by hiding the quantity of sensitive data associated with an entity from the user.

The present disclosure can also be viewed as providing a method to process data collected from at least one source to generate a target list of entities. In this regard, one embodiment of such a method, among others, can be broadly summarized by the following steps: integrating at least one source database to collect data and store the data in a base data layer; selecting the data from the base data layer and processing the data to create and store a quantity of informative data in a data store; processing the quantity of informative data to deselect a quantity of sensitive data associated with the quantity of informative data by applying at least one privacy technique to protect the quantity of sensitive data; analyzing the quantity of informative data with respect to a predetermined analytical score of the quantity of informative data from the base data layer; and generating the target list of entities by processing the quantity of informative data upon receiving at least one request from a user, wherein the user accesses the quantity of informative data so protected and the predetermined analytical score, wherein the quantity of informative data and the predetermined analytical score are displayed to the user by hiding the quantity of sensitive data associated with an entity from the user.

The present disclosure can also be viewed as providing computer program product having embodied thereon a computer program to process data collected from at least one source to generate a target list of entities. Briefly described, in architecture, one embodiment of the computer program product, among others, can be implemented as follows. The computer program product comprises a non-transitory computer readable medium and a quantity of computer program instructions, recorded on a plurality of program code stored in the non-transitory computer readable medium and executable by a processor. The plurality of program code comprises: a program code for integrating at least one source database to collect data and store the data in a base data layer; a program code for selecting the data from the base data layer and processing the data to create and store a quantity of informative data in a data store; a program code for processing the quantity of informative data to deselect a quantity of sensitive data by applying at least one privacy technique to protect the quantity of sensitive data; a program code for analyzing the quantity of informative data with respect to a predetermined analytical score of the quantity of informative data from the base data layer; and a program code for generating the target list of entities by processing the quantity of informative data upon receiving at least one request from a user, wherein the user accesses the quantity of informative data so protected and the predetermined analytical score, wherein the quantity of informative data and the predetermined analytical score are shown to the user by hiding the quantity of sensitive data associated with an entity from the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

System and method to process data collected from one or more sources to generate a target list of entities is described. Present disclosure provides unique technical features to external customers may be for B2B customers through an Information Platform which provides an easy to use analytical layer to analyze customer data held by the organization. Present disclosure creates external facing information platform which would expose desensitize customer information. In addition to information platform, this solution also exposes an API layer so that applications can be built in-house or by partners and these applications can further enhance the prospects of monetization of information asset.

In accordance with the present subject matter, one or more data sources are integrated to collect data related to customer and stored in a database. The data is selected from the database and further processed where sensitive data is filtered or masked by applying privacy techniques to protect the informative data. The informative data is further analyzed with respect to a predetermined analytical score of the informative data. The informative data and the analytical score is displayed to the user by hiding the sensitive information. The user can submit his request by analyzing the informative data provided to him. Further, based on the user request, a target list of entities is generated by processing the informative data. A campaign for the target list of entities can be scheduled and executed based on the user's request wherein the entities would be contacted to offer the services from the user.

While aspects of described system and method for processing data collected from sources to generate a target list of entities may be implemented in any number of different computing systems, environments, and/or configurations, the embodiments are described in the context of the following exemplary system.

Figure 1:
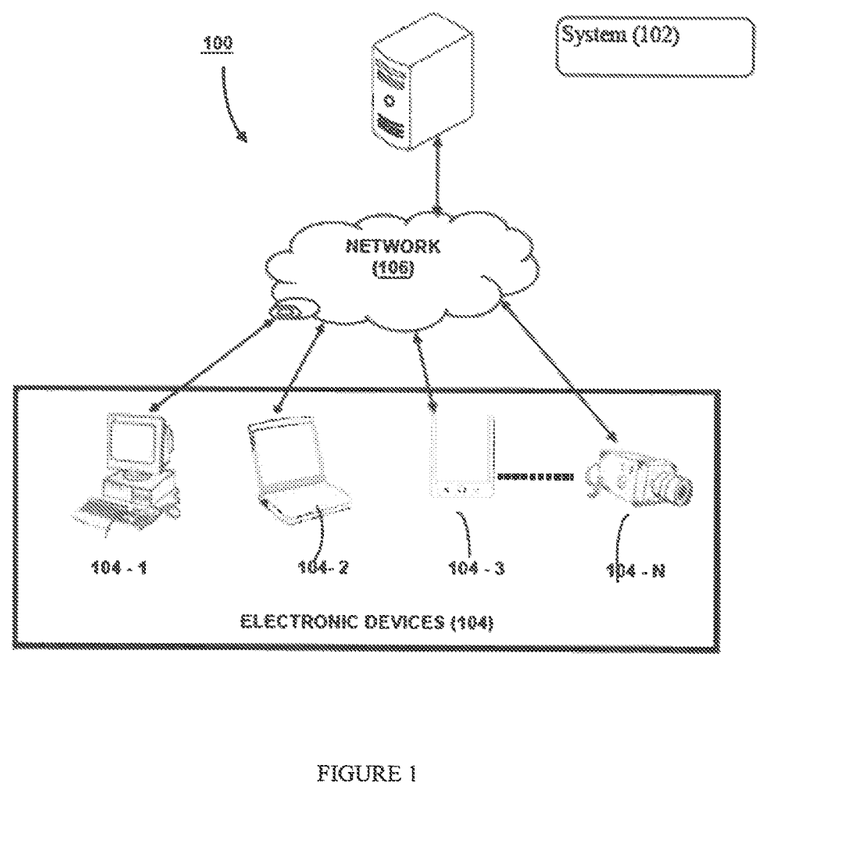
FIG. 1 illustrates a network implementation of a system to process data collected from one or more sources to generate a target list of entities is shown, in accordance with an embodiment of the present subject matter.

Referring now to FIG. 1, a network implementation 100 of a system 102 generating a target list of entities is illustrated, in accordance with an embodiment of the present subject matter.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, smart phones and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
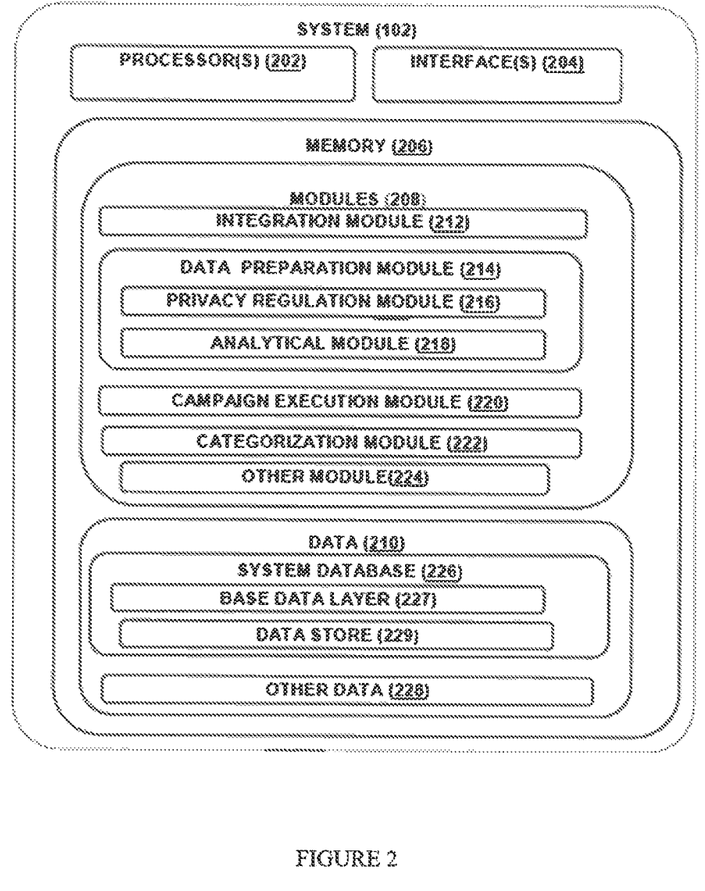
FIG. 2 illustrates the system to process data collected from one or more sources to generate the target list of entities, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an integration module 212, a data filtering module 214, a privacy regulation module 216, an analytical module (218), a campaign execution module 220, a categorization module 222 and other modules 224. The other modules 224 may include programs or coded instructions that supplement applications and functions of the system 102.

The data 210, amongst other things, serves as a repository for storing data processed, received, and generated by one or more of the modules 208. The data 210 may also include a system database 220, and other data 222. The system database further comprises of a base data layer 227 and a data store 229. The other data 222 may include data generated as a result of the execution of one or more modules in the other module 218.

In one implementation, at first, a user may use the client device 104 to access the system 102 via the I/O interface 204. The user may register them using the I/O interface 204 in order to use the system 102. The working of the system 102 may be explained in detail in FIG. 2 and FIG. 4 explained below. The system 102 may be used for processing data from one or more sources and to generate a target list of entities.

In accordance with an embodiment of the present subject matter, referring to FIG. 2, the system 102 for processing data from one or more sources and to generate a target list of entities is described. Referring now to FIG. 2, the working of the integration module is illustrated, in accordance with an embodiment of the present subject matter. The integration module is configured to integrate one or more source databases in order to collect data and store the data in a base data layer 227. The source databases comprises customer household view database, Customer usage data, xDR's, financial transaction database, Social media feeds, Customer consents and preferences, External data, Campaign history and responses etc. The data sources are integrated which provide insight about customer behavior and buying pattern. The data integration module may have capability to add on the databases which can be integrated further as on the requirement.

In addition to above, it includes analytical scores which are derived in the base layer. Following is the list of various type of analytical scores which are to be included in a data store 229 but not limited to:

1. Customer propensity to buy new products—It is a derived score (number) calculated for the individual based on the previous offer made to him and his purchase history. Individuals positively responding to offer (i.e. looking to buy) or buying more offers in the previous campaigns are given higher score.

2. Customer interest in a particular product category—It is a derived score (number) calculated for the individual for a particular product category. Based on the previous offers for various product categories e.g. cinema, food/drinks, score is populated e.g. if the customer has accepted more offers frequently in food/drinks than in cinema then food/drink would be given higher score than cinema product category.

3. Customer likeliness to respond—It is a derived score (number) calculated for the individual which shows that whether customer would respond to the new campaigns or not. A customer responding to previous offers is given higher score than customer ignoring the previous offers. This score is also related to the type of product categories offered e.g. one customer can be more responsive to food/drink but not responsive to another product category.

These scores are combined with the customer data mentioned above to help create the segmentation e.g. new pizza shop "Jerry's" in the locality is the user of the information platform, by analyzing the customer usage (call records) they have found that there are 10000 individuals who live in post code X and have made calls to local pizza but at least 3 times in last 15 days. Jerry's now want to schedule this campaign is 4 lots. In the $1^{st}$ lot, they can select the customers who have the highest score for "customer propensity to buy new products. For the subsequent lots, customers with lower scores can be selected.

In accordance with an embodiment of the present subject matter, customer household view database can be derived by using customer data from the data warehouse & master data management of the organization. Customer household view data further includes but not limited to all contacts on every address from the database, Contacts demographic information i.e. gender, age group, all the products held by the customer in the house e.g. broadband, prepaid mobile, post-paid mobile, credit card etc., Consents and Preferences of the customer which states whether customer has provided his preference to receive offer i.e. food, entertainment etc. and whether he has opted in for third party offers and analytical scores about the customer e.g. customer propensity to buy new products, customer's interest in particular product category etc.

Customer usage data includes customer events & contents further includes but not limited to voice call data records including fixed line and mobile, customer location records can be useful for location based marketing and data usage records i.e. internet usage to check which shopping sites customer browses e.g. pizza online etc and these can be used to infer the interest areas.

Financial transaction database comprises financial product usage data further includes financial transactions of the household such as credit card transactions—these information would not itemize what product customer has bought but would provide enough information to make a good judgment about customers purchase capacity, bill payment including information about regular payment to utility companies i.e. EMI or TV or internet bills.

Social media feeds comprise social media data collected from various social websites at the user level and further same data is co-related to the customer base. This provides additional information about customer's area of interests and their feedback about brands or merchants. External data comprises business directory data for example pizza outlet phone numbers for home delivery, list of take away/delivery website etc. This data is to be used to lookup the target phone number in the call data records to establish which business the call was made to. This data can be purchased centrally by the organization or users can upload it in their access portal area it as per their requirements. The external data further includes customer demographic information e.g. age, income group etc. This data is used to enrich the internal customer data.

Campaign history and responses database comprises the data collected from the customer contact history of the previous campaigns made to him and the outcome of the contact i.e. whether customer showed the interest in the campaign, did he buy or he denied to the offer made stating some other preference. This campaign history is further expanded to include contacts made for the products from the customers. Most of the data mentioned above may already being collected, processed and stored in the data warehouses to be used for organization's business intelligence requirement.

Figure 4:
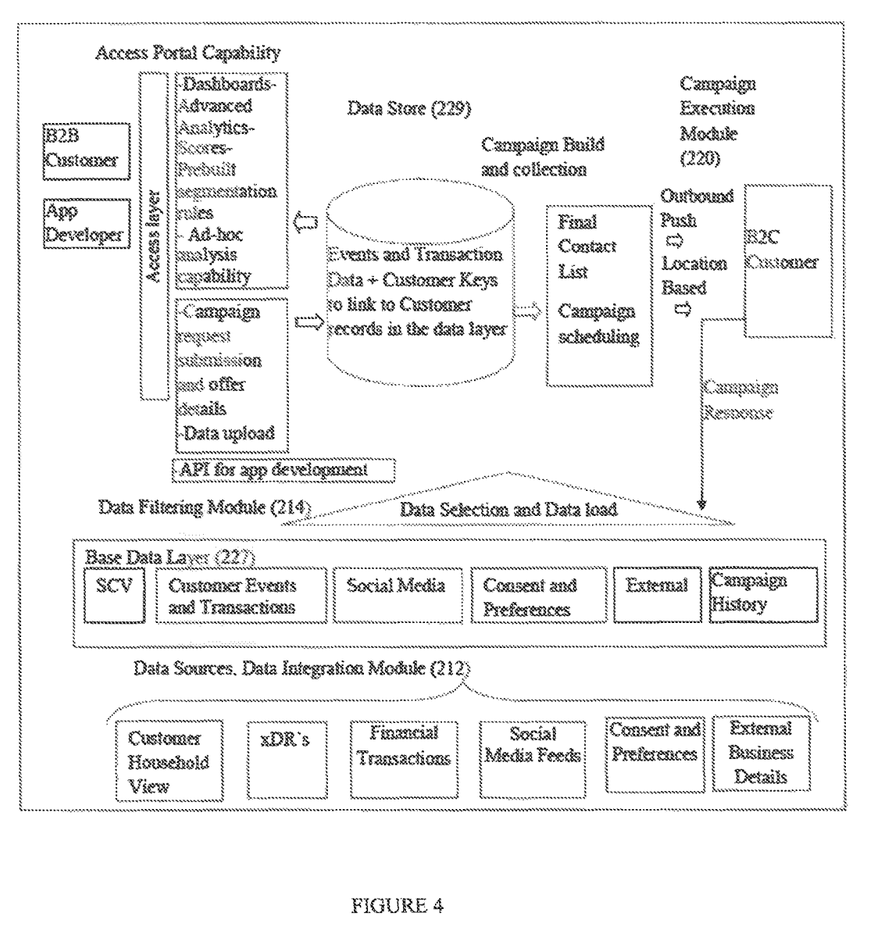
FIG. 4 illustrates an overall functioning of the disclosure in accordance with an embodiment of the present subject matter.

Referring to FIG. 2 and FIG. 4, the data integration module is further configured to store the collected data in a base data layer 227 having in but not limited to various subject area databases such as SCV (single customer view), Customer events and transaction, Social media, Consent and preferences, External and Campaign History where applicable data is stored in associated database.

Referring to FIG. 2 and FIG. 4, a data preparation module is configured to select the data from the base data layer 227 and process the data to store an informative data in a data store 229. The data preparation module further comprises a privacy regulation module configured to process the informative data to deselect a sensitive data by applying one or more privacy technique. The sensitive data further comprises a set of personal information, the set of personal information further includes an account number, a phone number, and date of birth of a customer and alike by which a customer can be identified. The privacy technique applied by the privacy regulation module further includes a masking technique, a filtration technique.

Referring to FIG. 2 and FIG. 4, in one implementation the data store 229 contains the customer transactions and events data without customer's individual information by protecting customer data privacy. The data store 229 would contain the information including customer post code, gender, age group, preferences, income group. The information cannot contain customer email, phone number or complete address. Contact surrogate key would be available to link the customer record back to the base data. By way of an example, depending upon the data volume involved and process capacity of data layer, the data store 229 can be a physical data store or can be an API on base data layer. In this case, API layer would ensure that customer sensitive details are not exposed to the external users.

Figure 5:
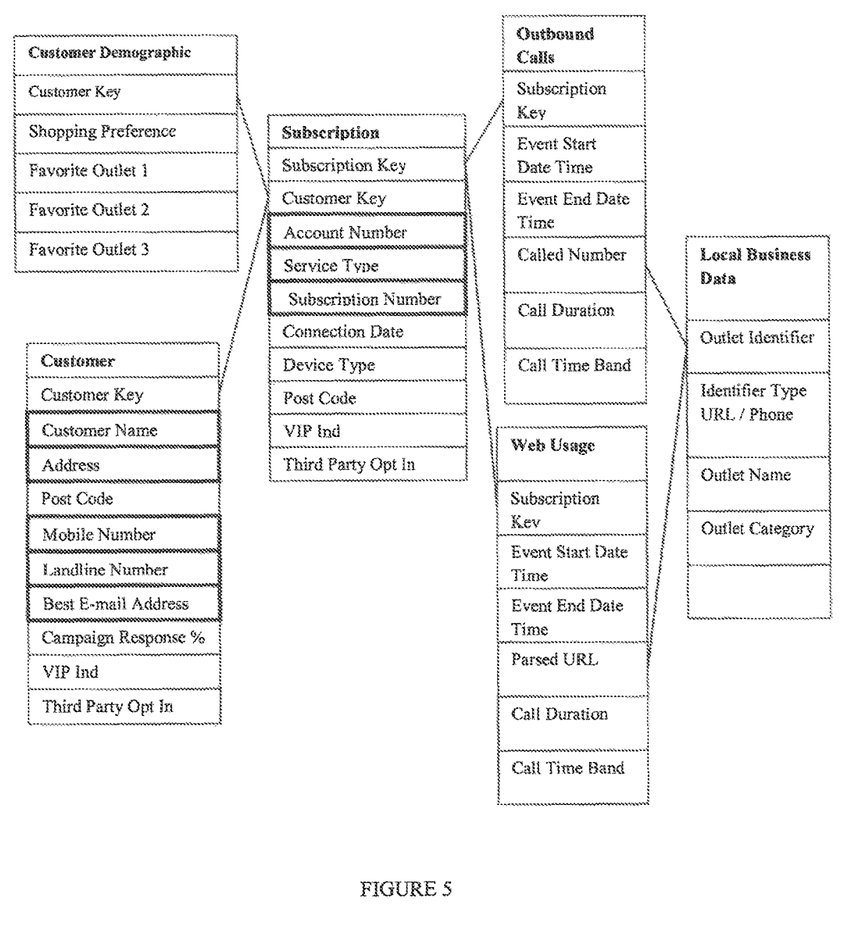
FIG. 5 illustrates a table containing sample sensitive information that can be masked under the privacy regulation module.

Referring to FIG. 2 and FIG. 4, the privacy regulation module would deselect the customer sensitive information so that customer can not be identified with the data housed in the data store 229. By way of an example, referring to FIG. 5, information to be masked is shown. The information model shows the indicative list of entities those would be required in the data store 229. Values in the thick-border fields which can identify the customer would not be passed to the data store. If the data store 229 is designed as logical then this layer would act as the semantic layer and would mask the customer personal information e.g. Account Number, Phone Number, Data of Birth etc. and would stop them going to the data store.

Referring to FIG. 2 and FIG. 4, the data preparation module further comprises an analytical module configured to analyze the informative data with respect to a predetermined analytical score of the informative data from the base data layer 227. Further the analytical score so fetched from the base data layer 227 are stored in the data store 229. The analytical module further generates one or more reports with respect to the informative data. In one of the embodiment of the present subject matter, the user accesses the informative data and the analytical score by means of a user interface such that the informative data and the analytical score is displayed to the user by hiding the sensitive data associated with the entity from the user. The user can be a B2B client, customer organization, industry, a business group or a combination thereof. The entity further includes a client, customer, organization, industry or a combination thereof. The user accesses the informative data and the analytical score by means of the user interface further comprises the segmented information with one or more segment count. Based on the information accessed by the user, the user further submits his one or more request through the user interface 204. The personal data stored about entities in the data source is not to be shared with the user. The user is provided with the entities transactional data for analysis and segmentation purpose. Even after completing the analysis and building the customer segments, B2B customer would not be able to see the personal information of the entity. The user can submit the segmentation request and actual campaign execution is performed using organization's campaign execution system module.

Referring to FIG. 2 and FIG. 4, the memory 206 further comprises the categorization module 222 configured to categorize the informative data by using a segmentation rule. By way of an example, segmentation rules categorize the informative data into various categories based on the common interests and needs. For example, Heavy Buyers are the people who browse shopping sites most of the time, Deal hunters are the people who visit deal site e.g. www.hotukdeals.com or have quickly responded to the previous deals by the organization. Coffee lovers are the people who have always responded to previous 2 for 1 coffee shop deals.

Referring to FIG. 2 and FIG. 4, the campaign execution module 220 is configured to generate the target list of entities by processing the informative data upon receiving the request from the user. The campaign execution module 220 is further configured to schedule and to execute a campaign for the target list of entities based on the user's request wherein the entities would be contacted to offer the services from the user. By way of an example, once the user can be a B2B customer has selected the customer segmentation & submitted the request for campaign execution, the data preparation module 214 with the help of Customer keys would extracts the customer contact information from the base data layer 227 and would pass that to Campaign execution module 220 of the system 102. The target list of entities further includes the segmented informative data based on the user's requirement. The target list of entities is the list of entities which will be further selected and contacted for campaign execution.

Still referring to FIG. 2 and FIG. 4, in accordance with an embodiment, referring to the campaign execution module 220, the user submits the request for campaign execution, which includes Customer Segmentation Query, Offer to be attached in the campaign, Exclusion list, Campaign medium—SMS campaign, email campaign or Location based, Frequency for push campaign, Campaign expiry date etc. The campaign execution module receives the segmentation query and based on that further extracts the customer list from the base data layer based on the customer key. When the Customer & contact list is prepared, final exclusions is applied based on the exclusion list supplied in the request. Campaign is scheduled and further executed.

In accordance with still another embodiment of the present subject matter, organization can leverage existing campaign execution channels to deliver the campaigns to the end customers. The campaign can be executed in a variety of ways such as outbound Push—campaign using outbound call, SMS push or email and Location Based campaign where based on the location of the customer, relevant offers can either be shown on the smart phone app or can be pushed as SMS.

In accordance with still another embodiment of the present subject matter, response from the campaign executions can be captured using existing data integration capabilities in order to enrich the campaign history repository and further can be used to refine the future campaigns. This feature enhances the effectiveness of the campaign execution and target to the customer in future. Further it contributes to the savings in the cost of marketing and advertisement.

In accordance with another embodiment of the present subject matter, referring to FIG. 4, the users would be provided access to the data store 229 via access portal which would act as the gateway to the list of features the user can use to consume and analyze the information. The key features of the access portal include information application. The information application can be used to browse, analyze and consume the information held in the data store 229. One of the features includes vanilla dashboards built on the customer analytics. These pre-built dashboards and reports would provide aggregated information on the customer usage patterns with customer demographics. For example, people in a particular area under 35 years of age call a particular restaurant most of the time and they like that restaurant page on the social website. Flexibility will be provided to alter the parameters in the dashboards to change and re-organize the results. By way of an example, the dashboards and reports are to be created with BI tools (e.g. Cognos, Business Objects) or custom java screens.

The key feature of the access portal further includes advanced analytics scores extracted into the data store 229 from the base data layer 227. The data mining models may be further extended to provide customer affinity and propensity scores to buy a product. These scores would be included in the dashboards and reports or can be selected by the users in the self service ad-hoc analysis reports. Analytical module may further be coupled to the access portal to provide analytical capability to slice and dice the informative data to create trends and charts to perform what if analysis.

Another feature of the access portal includes provision of segmentation rules. Segmentation rules categorize the target set of customer into various categories based on the common interests and needs. Prebuilt segmentations rules may be provided for novice customers. Further the users can be provided with the flexibility to build their own segmentations rules.

One more feature of the access portal includes Ad-hoc analysis capability. In addition to vanilla dashboards, users can be provided with the feature to create their own analytics and reports on the data stored in the data store 229. Ad-hoc analysis capability may be provided by the BI tools (e.g. Business Objects, Cognos). Another feature of the access portal includes My Account Features wherein the users may be provided with individual area "My account" on the portal which will be controlled by the user. This feature provides the facility to upload their data in the individual area and then can map this data with wider information available in information application. This feature provides personalization of the information application as the users can upload the data and perform the analysis on that. E.g. Users can upload phone numbers of their local competitor and then can find the set of customer who have called those numbers frequently. While uploading the data, user can map the fields with the existing data in the data store (information application) e.g. mapping phone numbers with "called to" number in the call data records. e.g. local business directory to lookup the target number, campaign response data if the end user has directly contacted the customer. This data can then be used to join with the data already held in the data store. Once the user has selected the customer segment he wants to target to, he can submit the request for campaign execution including the details such as Customer Segmentation Query, Offer to be attached in the campaign, Exclusion list override e.g. if they do not want to include customers not paying in time, campaign medium—SMS campaign, email campaign or Location based, Frequency—valid only for push campaign, Campaign expiry date etc.

Another feature of the access portal includes API for Application development includes API layer in the access portal wherein a variety of applications can be built in-house or by partners leveraging the data housed in the data store and these applications can further enhance the prospects of exploit of information asset.

Figure 3:
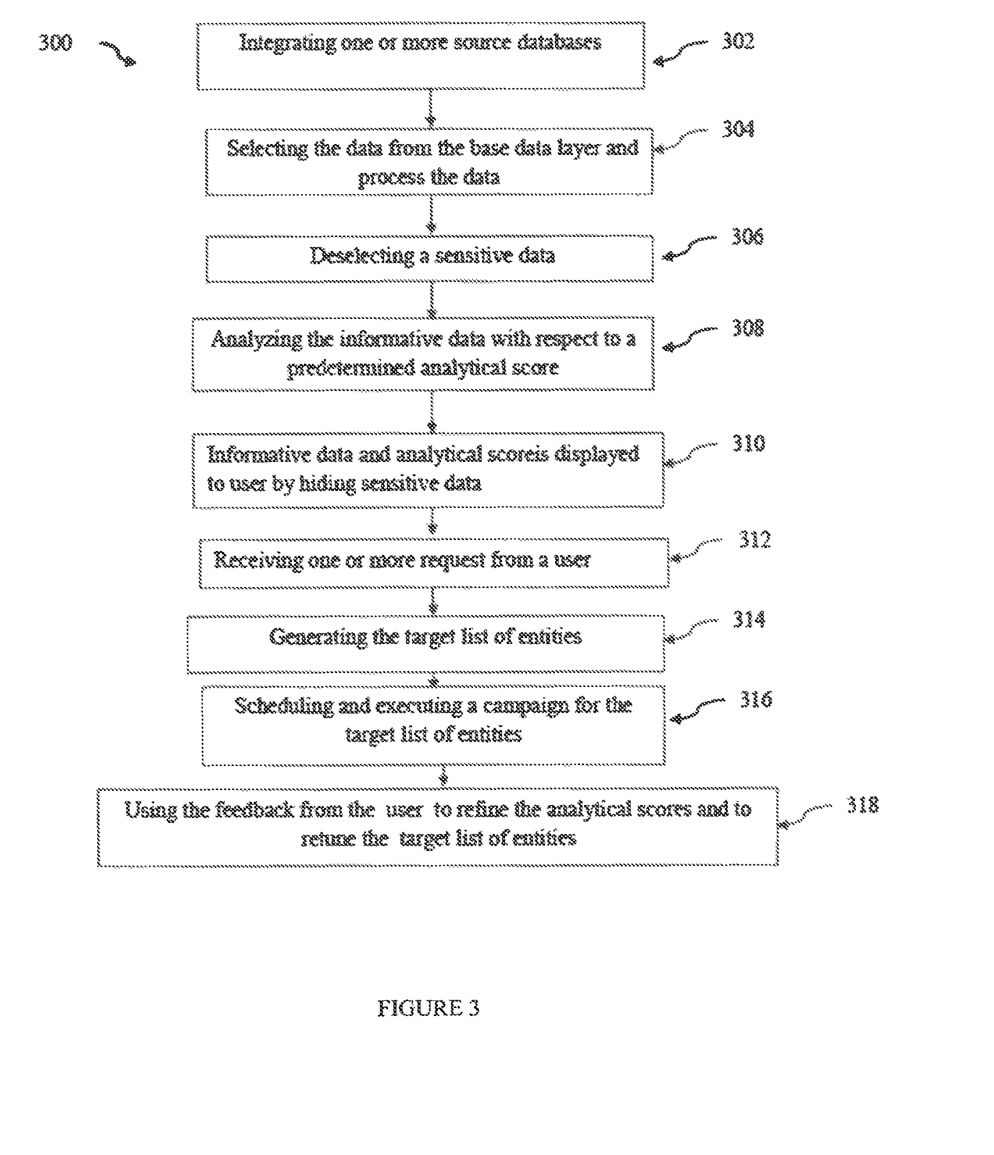
FIG. 3 illustrates a method to process data collected from one or more sources to generate the target list of entities, in accordance with an embodiment of the present subject matter.

Referring to FIG. 3, a method 300 to process data collected from one or more sources to generate a target list of entities is shown in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 described are not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

Referring to FIG. 3, a method 300 to process data collected from one or more sources to generate a target list of entities is described. In step 302, one or more source databases are integrated in order to collect data and store the data in a base data layer 227. In one implementation, the source databases are integrated order to collect data and store the data in a base data layer 227 by the integration module 212. The source databases comprises customer household view database, Customer usage data, xDR's, financial transaction database, Social media feeds, Customer consents and preferences, External data, Campaign history and responses, etc.

In step 304, the data is pulled from the base data layer 227 and the data is filtered to store an informative data in a data store 229. In one implementation, the data is pulled from the base data layer 227 and the data is filtered to store an informative data in the data store 229 by the data filtering module 214. The collected data comprises customer data, customer usage data, financial product usage data, social website usage data, business directory data, campaign history and responses data. In step 306, a sensitive data is filtered to prepare and store the informative data by applying one or more privacy technique. In one implementation, the sensitive data is filtered to prepare and store the informative data by applying one or more privacy technique by the privacy regulation module 216. The sensitive data further comprises of a set of personal information, the set of personal information further includes an account number, a phone number, date of birth of a customer and alike by which a customer can be identified. The privacy technique so applied further includes a masking technique.

In step 308, the informative data is analyzed and an analytical score is generated with respect to the informative data. In one implementation, the informative data is analyzed and the analytical score is generated with respect to the informative data by the analytical module 218. In step 310, the informative data and the analytical score is displayed to the user by hiding the sensitive data associated with the entity from the user. In one implementation, the informative data and the analytical score is displayed to the user by hiding the sensitive data associated with the entity from the user through the user interface 204 and through the access portal. The user further accesses the informative data and the analytical score displayed to him. In step 312, the user submits one or more request for campaign execution and the request is received by the system 102. In one implementation, the request submitted by the user is received by the campaign execution module 220. In step 314, the target list of entities is generated by processing the informative data along with the analytical score upon receiving the request from the user. In one implementation, the target list of entities is generated by processing the informative data along with the analytical score upon receiving the request from the user by the campaign execution module 220. The entity further includes a client, customer, organization, industry or a combination thereof. The user can be a B2B client, customer organization, industry, a business group or a combination thereof.

The method 300 further comprises of plugging in one or more external tools in order to supply the data associated with the entity. User is provided with access portal including Ad-hoc analysis capability. In addition to vanilla dashboards, users can be provided with the feature to create their own analytics and reports on the data stored in data store 229. Ad-hoc analysis capability may be provided by the BI tools (e.g. Business Objects, Cognos). Another feature of the access portal includes My Account Features wherein the users may be provided with individual area "My account" on the portal which will be controlled by the user. This feature provides the facility to upload their data in the individual area and then can map this data with wider information available in information application. This feature provides personalization of the information application as the users can upload the data and perform the analysis on that. The method 300 further comprises of mapping the user's data so uploaded with the informative data stored in the data store 229 to further generate the target list of entity.

In step 318 of the method 300, the feedback from the user is used to refine the analytical scores and to retune the target list of entities. In step 316 of the method 300, a campaign for the target list of entities is scheduled and executed based on the user's request wherein the entities would be contacted to offer the services from the user. Once the user has selected the customer segment he wants to target to, he can submit the request for campaign execution, the request may further include the details such as Customer Segmentation Query, Offer to be attached in the campaign, Exclusion list for example if the user do not want to include customers not paying in time, campaign medium—SMS campaign, email campaign or Location based, Frequency—valid only for push campaign, Campaign expiry date etc. The method 300 further comprises, segmenting the informative data based on the request submitted by the user. The method 300 further comprises, segmenting the informative data based on the customer segmentation query provided by the user.

The method 300 further comprises of categorizing the target list of entities by using a segmentation rule. The method 300 further comprises of generating one or more reports with respect to the informative data.

WORKING EXAMPLE

Ram and Ganesh are the Airtel mobile and landline customers and they live in Thakur Complex, Kandivli (E). Here is the information held by Airtel CRM system for both of them. It may be further observed that both customers have opted in for $3^{rd}$ party offers by airtel.

| Customer Key | Customer Name | Address | Post Code | Mobile No | Landline | Email Id | $3^{rd}$ Party Opt in flag |
|---|---|---|---|---|---|---|---|
| A667 | Ram | 3 Preeti Vihar Thakur Complex Kandivli (E) | 400089 | 9867345676 | 66678999 | ram@gmail.com | Y |
| A669 | Ganesh | 3 Satyam apts Thakur Complex Kandivli (E) | 400089 | 9869085676 | 66678989 | ganesh@gmail.com | Y |

Airtel uses an existing extract, transformation and load tool to load this data into base data layer 227. In addition to this, base data layer has also source usage records data from billing/switch systems that includes:

Call made or received to their mobile and landline numbers.

And Web browsing history

And Sms sent by Ram & Ganesh.

Customer records are also enriched with derived analytical scores which are required by the marketing & campaign management team of Airtel. Example of the analytical scores is described above.

Now while extract the required data from the base data layer 227, only following fields are extracted from the base data layer while hiding the sensitive information (like email ID etc). Customer record in data store would look like:

| Customer Key | Customer Propensity to Buy | Post Code | 3$^{rd}$ Party Opt in flag |
|---|---|---|---|
| A667 | 87 | 400089 | Y |
| A669 | 35 | 400089 | Y |

Now this data is exposed to external user e.g. Jerry's pizza via a secured online portal. Jerry's wants to target the shoppers of its local competitor Pizzahut. Jerry's uses my account feature of the portal to upload the phone number of PizzaHut e.g. 02266675655. Now, Jerry's runs a report on how many customers have dialed 02266675655 at least 3 times in last 2 weeks. It is found that both A667 and A669 have dialed this number. Now, looking at the "propensity score to buy", Jerry would want to target A667 first and then A669 later as A667 is more likely to accept Jerry's offer. Jerry's does not have the contact details of any of these customers and therefore puts a online request in the portal for Airtel to send "buy one get one free" (this is offer code) offer to customer A667 by sms. Now, customer phone number and Name of customer A667 are extracted from base data layer and sms campaign is scheduled to send sms to Ram with the offer code. Now is Ram redeems the offer code, campaign response record are updated in the base data layer for further fine tuning of the campaigns and same response is used to recalculate the analytical score—
1. Customer propensity to buy new products
2. Customer interest in a particular product category
3. Customer likeliness to respond The above example is explained to describe the disclosure for which the intent is not to limit the scope of disclosure.

I claim:

1. A system to process data collected from at least one source to generate a target list of entities, the system comprising:

a processor; and a memory coupled to the processor, wherein the processor is configured to:

integrate at least one source database to collect data and store the data in a base data layer and add at least one additional source database for integration based on a requirement;

select the data from the base data layer and process the data to create and store informative data in a data store, wherein the data store is a physical data store depending on a process capacity of the base data layer, wherein the informative data is recorded back to the base data layer using a surrogate key;

process the informative data to deselect a sensitive data associated with the data by applying at least one privacy technique to protect the sensitive data, wherein the privacy technique comprises of a masking technique and a filtering technique;

analyze the informative data with respect to a predetermined analytical score of the informative data from the base data layer, wherein the predetermined analytical score is based on a first derived score indicative of willingness of an entity to buy one or more new products, a second derived score indicative of willingness of the entity in one or more product categories, and a third derived score indicative of likelihood of the entity responding to a new campaign;

categorize the target list of entities by using a segmentation rule, wherein the segmentation rules are pre-built or generated by the user based on the user's requirements;

generate the target list of entities by processing the informative data upon receiving at least one request from a user, wherein the user accesses the informative data so protected through a gateway and the predetermined analytical score with a user interface; wherein the gateway extracts the predetermined analytics score into the data store from the base data layer and also provisions the segmentation rules, and wherein the informative data and the predetermined analytical score are displayed to the user by hiding the sensitive data associated with an entity from the user, wherein the predetermined analytical score is refined and the target list of entities are retuned in accordance with the at least one request from the user, wherein the gateway provides a facility for the user to upload user's data and perform an analysis by mapping fields with the informative data in the data store while uploading the user's data; and schedule and execute a campaign for the target list of entities based on the at least one request from the user, wherein the entities are contacted to offer at least one service from the user, wherein the informative data is extracted from the base data layer based on a customer key in response to the at least one request.

2. The system of claim 1, wherein the entity includes at least one of a client, a customer, an organization, and an industry.

3. The system of claim 1, wherein the user includes at least one of a client, a customer organization, an industry, and a business group.

4. The system of claim 1, wherein the collected data further comprises at least one of customer data, customer usage data, financial product usage data, social website usage data, business directory data, campaign history and responses data.

5. The system of claim 1, wherein the processor is further configured to support plug in of external tools in order to supply the data associated with the entity.

6. The system of claim 1, wherein the user accesses the informative data, and the predetermined analytical score, wherein the predetermined analytical score further comprise segmented information with at least one segment count.

7. The system of claim 1, wherein the mapping of the user's data with the informative data is to enrich and generate the target list of entities.

8. The system of claim 1, wherein the processor is further configured to generate at least one report with respect to the informative data.

9. A method to process data collected from at least one source to generate a target list of entities, the method comprising processor implemented steps of:

integrating at least one source database to collect data and store the data in a base data layer and adding at least one additional source database for integration based on a requirement;

selecting the data from the base data layer and processing the data to create and store a informative data in a data store, wherein the data store is a physical data store depending on a process capacity of the base data layer, wherein the informative data and recorded back to the base data layer using a surrogate key;

processing the informative data to deselect a sensitive data associated with the informative data by applying at least one privacy technique to protect the sensitive data, wherein the privacy technique comprises of a masking technique and a filtering technique;

analyzing the informative data with respect to a predetermined analytical score of the informative data from the base data layer, wherein the predetermined analytical score is based on a first derived score indicative of willingness of an entity to buy one or more new products, a second derived score indicative of willingness of the entity in one or more product categories, and a third derived score indicative of likelihood of the entity responding to a new campaign;

generating the target list of entities by processing the informative data upon receiving at least one request from a user, wherein the user accesses the informative data so protected through a gateway; wherein the gateway extracts the predetermined analytics score into the data store from the base data layer and also provision the segmentation rules, and wherein the informative data and the predetermined analytical score are displayed to the user by hiding the sensitive data associated with an entity from the user, wherein the predetermined analytical score is refined and the target list of entities are retuned in accordance with the at least one request from the user, wherein the gateway provides a facility for the user to upload user's data and perform an analysis by mapping fields with the informative data in the data store while uploading the user's data;

categorizing the target list of entities by using a segmentation rule, wherein the segmentation rules are prebuilt or generated by the user based on the user's requirements; and scheduling and executing a campaign for the target list of entities based on the at least one request of the user, wherein the entities are contacted to offer at least one service from the user, wherein the informative data is extracted from the base data layer based on a customer key in response to the at least one request.

10. The method of claim 9, wherein the entity includes at least one of a client, a customer, an organization, and an industry.

11. The method of claim 9, wherein the user is at least one of a client, a customer organization, an industry, and a business group.

12. The method of claim 9, wherein the collected data further comprises at least one of customer data, customer usage data, financial product usage data, social website usage data, business directory data, campaign history and responses data.

13. The method of claim 9, further comprising mapping of the user's data with the informative data stored in the database to further generate the target list of entities.

14. The method of claim 10, further comprising generating at least one report with respect to the informative data.

15. A computer program product having embodied thereon a computer program to process data collected from at least one source to generate a target list of entities, the computer program product comprising:

a non-transitory computer readable medium and a quantity of computer program instructions, recorded on a plurality of program code stored in the non-transitory computer readable medium and executable by a processor, the plurality of program code comprising:

a program code for integrating at least one source database to collect data and store the data in a base data layer and adding at least one additional source database for integration based on a requirement;

a program code for selecting the data from the base data layer and processing the data to create and store a informative data in a data store, wherein the data store is a physical data store depending on a process capacity of the base data layer, wherein the informative data and recorded back to the base data layer using a surrogate key;

a program code for processing the informative data to deselect a sensitive data by applying at least one privacy technique to protect the sensitive data, wherein the privacy techniques comprises of a masking technique and a filtering technique;

a program code for analyzing the informative data with respect to a predetermined analytical score of the informative data from the base data layer, wherein the predetermined analytical score is based on a first derived score indicative of willingness of an entity to buy one or more new products, a second derived score indicative of willingness of the entity in one or more product categories; and a third derived score indicative of likelihood of the entity responding to a new campaign;

a program code for generating the target list of entities by processing the informative data upon receiving at least one request from a user, wherein the user accesses the informative data so protected through a gateway; wherein the gateway extracts the predetermined analytics score into the data store from the base data layer and also provision the segmentation rules, and wherein the informative data and the predetermined analytical score are shown to the user by hiding the sensitive data associated with an entity from the user, wherein the predetermined analytical score is refined and the target list of entities are retuned in accordance with the at least one request from the user, wherein the gateway provides a facility for the user to upload user's data and perform an analysis by mapping fields with the informative data in the data store while uploading the user's data;

a program code for categorizing the target list of entities by using a segmentation rule wherein the segmentation rules are prebuilt or generated by the user based on the user's requirements; and a program code for scheduling and executing a campaign for the target list of entities based on the at least one request of the user, wherein the entities are contacted to offer at least one service from the user, wherein the informative data is extracted from the base data layer based on a customer key in response to the at least one request.

* * * * *

UNITED STATES PATENT AND TRADEMARK OFFICE
CERTIFICATE OF CORRECTION

| | | |
|---|---|---|
| PATENT NO. | : 10,453,091 B2 | Page 1 of 1 |
| APPLICATION NO. | : 14/286073 | |
| DATED | : October 22, 2019 | |
| INVENTOR(S) | : Ankur Agarwal | |

It is certified that error appears in the above-identified patent and that said Letters Patent is hereby corrected as shown below:

In the Claims

Claim 9, Column 15, Line 12 insert --quantity of-- before "informative data"

Signed and Sealed this
Seventh Day of April, 2020

Andrei Iancu
*Director of the United States Patent and Trademark Office*